United States Patent [19]

Filipov et al.

[11] Patent Number: 5,923,459

[45] Date of Patent: Jul. 13, 1999

[54] ACCUSTO-OPTIC TIME-INTEGRATING CORRELATOR FOR PROCESSING BROADBAND DOPPLER-SHIFTED SIGNALS

[75] Inventors: Andree N. Filipov, Silver Spring; Norman J. Berg, deceased, late of Baltimore, both of Md., by Lydia Ferne Berg, legal representative

[73] Assignee: The United States of America as represented by the Secretary of the Army, Washington, D.C.

[21] Appl. No.: 08/989,796

[22] Filed: Dec. 19, 1997

[51] Int. Cl.$^6$ ................................ G02F 1/33; G02F 1/11
[52] U.S. Cl. ...................... 359/305; 359/285; 359/311
[58] Field of Search ................................. 359/285–287, 359/305, 306, 311

[56] References Cited

U.S. PATENT DOCUMENTS

| | | | |
|---|---|---|---|
| 4,326,778 | 4/1982 | Berg et al. | 359/306 |
| 4,421,388 | 12/1983 | Berg et al. | 359/306 |
| 4,426,134 | 1/1984 | Abramovitz et al. | 359/306 |
| 4,531,195 | 7/1985 | Lee | 364/822 |
| 4,566,760 | 1/1986 | Abramovitz et al. | 359/306 |
| 4,722,596 | 2/1988 | Labrum et al. | 359/306 |
| 5,121,248 | 6/1992 | Mohon et al. | 359/306 |
| 5,153,597 | 10/1992 | Hueber et al. | 342/192 |
| 5,420,826 | 5/1995 | Abramovitz | 367/100 |

Primary Examiner—Georgia Epps
Assistant Examiner—Suzanne Letendre
Attorney, Agent, or Firm—Paul S. Clohan, Jr.

[57] ABSTRACT

This invention relates to an acousto-optic time-integrating correlator for processing broadband Doppler-shifted signals. The present invention uses a conical lens telescope to compensate, in one dimension, for the differences in the absolute values of Doppler shift occurring in broadband signals. A laser light beam is expanded to a sheet beam using a conventional beam expander. The sheet beam is split and redirected using a modified Koster's prism. The two sheet beams are them directed toward a SAW device. The SAW device contains two tilted transducers. The inputs to the SAW device are counterpropagating A Doppler-shifted sheet beam and an undiffracted sheet beam are processed by respective conical lens telescopes. The outputs of the conical lens telescopes are combined with associated unprocessed sheet beams and combined by respective modified Koster's prisms and imaged onto respective two-dimensional photodetectors. The output of one photodetector is subtracted from the other to reduce offsets. Three alternate embodiments are also disclosed which show how a conical lens telescope can be used to improve the broadband performance of prior art approaches that use cylindrical lenses.

4 Claims, 5 Drawing Sheets

¹

ACCUSTO-OPTIC TIME-INTEGRATING CORRELATOR FOR PROCESSING BROADBAND DOPPLER-SHIFTED SIGNALS

TECHNICAL FIELD OF THE INVENTION

This invention relates to the processing of broadband, Doppler-shifted signals and more particularly to an accusto-optic time-integrating correlator for processing broadband Doppler-shifted signals.

BACKGROUND OF THE INVENTION

It is often desired to process broadband signals, (e.g., radar signals) which interacted with an item in order to determine the range, velocity, and acceleration of the item. But unfortunately, these broadband signals frequently contain a Doppler shift.

The Doppler effect is typically defined as the apparent change in the frequency of a wave, as a light wave or a sound wave, resulting from relative motion of the source and the receiver. The Doppler shift is typically defined as the magnitude of the change in frequency or wavelength of waves caused by the Doppler-effect.

For a broadband signal, each frequency component is Doppler shifted by the same ratio. The result is a different frequency shift for each frequency component of the signal. For example, a 10% Doppler shift would shift a 30 Hz signal component by 3 Hz while shifting a 300 Hz signal component by 30 Hz. The difference in the absolute frequency shifts complicates the signal processing of broadband Doppler-shifted signals. By performing a Fourier analysis on the signal, it can be shown that the Doppler effect occurs in the time domain as well.

The Doppler effect appears everywhere broadband signals appear. The Doppler effect is particularly evident in acoustic signals because the frequency components of an acoustic signal can span several octaves, or even several decades.

Acoustic signals tend to have low propagation velocities. A correlation may exist between two signals that have different propagation velocities. If a correlation exists, the time that it takes to correlate the signals may indicate the range of the item. Processing becomes much more difficult if the item is moving. If a correction is not made to the Doppler shift, it may be impossible to find a correlation between signals that are related.

Two architectures have emerged in schemes that correct for Doppler shift in signals. These two architectures are the space-integrating architecture and the time-integrating architecture. The features to note in the space-integrating architecture are 1) the integration time is equal to the time aperture of the delay line and 2) one of the signals must be time-inverted in order to achieve correlation. These statements can be shown to be correct by any college level text book on the subject. A mathematical proof here would only obscure the significance of the present invention. The features to note in the time-integrating architecture are 1) it is not necessary to time invert one of the signals and 2) integration time is determined by the photodetector.

Therefore, the space-integrating architecture is appropriate when the duration of the signal(s) to be correlated is/are equal to the time aperture of the delay line and it is convenient to time invert one of the signals. The time-integration architecture is appropriate when the time duration of the signal(s) is/are much longer than the time aperture of the delay line (but less than or equal to the integration time of the photodetector) or it is inconvenient to time-invert one of the signals.

The space-integrating architecture is more suited for radar application where the time-integrating architecture is more suited for processing signals received from two different sites. The present invention proposes new time-integrating schemes for correcting Doppler-shifted broadband signals.

The following U.S. patents where found that deal with time-integrating acousto-optic devices and/or ways to improve the broadband performance of acousto-optic devices: U.S. Pat. Nos. 4,326,778; 4,421,388; 4,426,134; 4,531,195; 4,566,760; 4,722,596; 5,121,248; and 5,153,597. But none of these patents disclose the use of a conical lens telescope to improve the broadband performance of time-integrating acousto-optic devices as the present invention does.

SUMMARY OF THE INVENTION

It is an object of the present invention to correct for Doppler shift in broadband signals. It is another object of the present invention to correct for Doppler shift in broadband signals by using a time-integrating architecture. It is yet another object of the present invention to reduce the offset in Doppler-shift-corrected broadband signals. It is still another object of the present invention to improve upon three basic acousto-optic time-integrating correlators by adding a one-dimensional expander, preferably a conical lens telescope, in order to improve processing performance of broadband Doppler-shifted signals.

A key differences between the prior art and the present invention is that the present invention uses a conical lens telescope where the prior art may have used a cylindrical lens. The benefit of using a conical lens telescope is the ability to apply different magnification factors to different components of a signal. This ability allows the different absolute values of frequency change in a Doppler-shifted signal to be compensated for.

A conical lens telescope is made up of two conical lenses as shown in FIG. 1. The two conical lenses are in line but the second conical lens is inverted (and rotated) with respect to the first conical lens.

The conical lens telescope exhibits variable magnification in one dimension because it has a longer focal length at its wide end than it has at its narrow end. The magnification factor achieved by placing one lens after another is that the focal length of the second lens is divided by the focal length of the first lens. Therefore, at the top of a conical lens telescope, where the focal length of the second lens is longer than the focal length of the first lens, the magnification factor is some number greater than one. Similarly, at the bottom of a conical lens telescope, where the focal length of the second lens is shorter than the focal length of the first lens, the magnification factor is some number less than one. The result is that images at the top of a conical lens telescope will be expanded while images at the bottom will be compressed. The images in the middle of a conical lens telescope will not change because here, the focal lengths are the same.

The present invention uses the variable magnification feature of the conical lens telescope to compensate, in one dimension, for the differences in the absolute values of Doppler shift occurring in broadband signals. For example, different magnification factors can be applied to a 30 Hz frequency components of a signal (which is changed to a 33 Hz signal by a 10% Doppler shift) and a 300 Hz frequency component of the same signal (which is changed to a 330 Hz signal by the same 10% Doppler shift) in order to recover the original unaltered frequency components (i.e., 30 Hz and 300 Hz) of the signal.

The best mode of the present invention is depicted in FIG. 2 which shows a time-integrating architecture which is useful for correcting for Doppler shift in broadband signals.

First, a laser light beam is expanded to a sheet beam using a conventional beam expander. The sheet beam is then split and angled using a conventional device known as a modified Koster's prism. Each sheet beam is tilted $\pm 2theta_B$ from the perpendicular. These two sheet beams are them directed toward a SAW device.

The SAW device contains two transducers, one at one end and one at the other end. The transducers are tilted from the perpendicular to the direction of SAW propagation in order to reduce interfering terms. The present invention tilts these transducers $\pm 3theta_B$ where $theta_B$ is equal to the Bragg diffraction angle.

The SAW device has two inputs. One input is inserted into a first end of the SAW device and propagates to the second end of the SAW device while the other input is inserted into the second end of the SAW device and propagates to the first end of the SAW device. These two inputs can be said to be counterpropagating.

The acoustic input to one of the transducers of the SAW device is of the form $A_2(t) \cos w_2 t$, where $A_2(t)$ is the received signal which contains a Doppler-shifted broadband signal. $A_2(t)$ amplitude-modulates a carrier at frequency w, where w corresponds to the center frequency of the SAW device. A reference signal, which contains little or no Doppler shift, of the form $A_1(t) \cos w_1 t$ is the input to the other transducer of the SAW device The two input signals to the SAW device are counterpropagating.

The right-hand sheet beam emanating from the modified Koster's prism will preferentially interact with $A_2(t) \cos w_2 t$ (i.e., the Doppler-shifted signal). The left-hand beam of the modified Koster's prism will preferentially interact with $A_1(t) \cos w_1 t$ (i.e., the reference signal). The SAW device will diffract the two sheet beams and shift them up in frequency. The right-hand beam will be shifted up in frequency by $w_2$ while the left-hand sheet beam will be shifted up in frequency by $w_1$.

Two pairs of diffracted sheet beams of interest will emanate from the SAW device. The first pair consists of two sheet beams of the form $A_1(t-tau) \cos (w_0+w_1)t$ and $A_2(t+tau) \cos (w_0+w_2)t$. These two diffracted sheet beams are separated by $8theta_B$, where $theta_B$ is the Bragg angle for the SAW device. The other pairs of sheet beams of interest are the undiffracted sheet beams (which came from the modified Koster's prism). The undiffracted sheet beams are separated by $4theta_B$.

The sheet beam $A_2(t+tau) \cos (w_0+w_2)t$ is imaged onto a conical lens telescope in order to variably-magnify each frequency component of the Doppler-shifted signal. The output of the conical lens telescope is then combined with $A_1(t-tau) \cos (w_0+w_1)t$ using a second modified Koster's prism. The output of the second modified Koster's prism then imaged onto a first two-dimensional photodetector array.

The undiffracted left-hand sheet beam is imaged onto a second conical lens telescope. The output of the second conical lens telescope is combined with the undiffracted right-hand sheet beam using a third modified Koster's prism. The output of the third modified Koster's prism is then imaged onto a second two-dimensional photodetector. The output of the second two-dimensional photodetector array represents the unmodulated light profile. Offsets occurring in the output of the first photodetector array are significantly reduced by subtracting the unmodulated light profile of the second photodetector array from the output of the first photodetector array.

The idea of using a conical lens telescope in order to process broadband signals can also be applied to prior art architectures that use cylindrical lenses. FIG. 3 depicts the first alternate embodiment of the present invention.

In FIG. 3, laser light is expanded to a sheet beam using a conventional beam expander. The resulting sheet beam is then divided into two sheet beams using a conventional beam splitter. These two sheet beam are then respectively imaged onto a first Bragg cell and a second Bragg cell. A Bragg cell is essential one that allows an acoustic input to diffract a light beam. The light beam output of the Bragg cell is now mathematically related to the acoustic input signal.

The acoustic input to the first Bragg cell is of the form $A_1(t) \cos wt$, where $A_1(t)$ is the received signal which contains Doppler-shifted broadband signals. $A_1(t)$ amplitude-modulates a carrier at frequency w, where w corresponds to the center frequency of the Bragg cell. A reference signal, which contains little or no Doppler shift, of the form $A_2(t) \cos wt$ is the input to the second Bragg cell. The outputs of the Bragg cells go through spatial filters in order to remove undiffracted light beams. The two input signals to the two Bragg cells are counterpropagating.

The signal-bearing light beam from the second Bragg cell is directed toward a conical lens telescope. The variable magnification factors of this telescope contracts and/or dilates $A_2(t-tau) \cos (w_0-w)t$ over the range that corresponds to the possible Doppler shift of signal $A_1(t)$. Therefore, a range of Doppler-shift-corrected $A_2(t)$'s are generated. One of these generated signals will correlate with $A_1(t)$.

The light beams are then combined in a conventional beam combiner and imaged onto a two-dimensional photodetector array. The photodetector array performs integration for the duration of the signals. The x-axis of the array corresponds to time delay between the two signals, from which range information can be obtained. The y-axis corresponds to the Doppler shifts, where the negative shifts on the top and the positive shifts on the bottom.

A second alternate embodiment of the present invention is depicted in FIG. 4. In this embodiment, the laser light beam is split using a conventional beam splitter. One of the split beams is then expanded to a sheet beam using a conventional beam expander. The expanded beam is then provided to a Bragg cell. The input signal to the Bragg cell, which contains broadband Doppler shifts, is of the form $A_2(t) \cos wt$. The spatially modulated output of this Bragg cell is of the form $A_2(t-tau) \cos (w_0-w)t$ where $w_0$ is the frequency of the light beam. The output is then directed toward a conical lens telescope for compression and dilation of the Doppler-shifted light beam.

The second split laser beam is directed toward a point-light modulator using a mirror. A second signal of the form $A_1(t) \cos wt$ is provided to the point-light modulator. A Bragg cell or an electro-optic modulator will suffice for a point-light modulator. The output of the point-light modulator is then expanded using a conventional beam expander. The output of the beam expander is then combined with the redirected output of the conical lens telescope using a conventional beam combiner. A mirror is used to redirect the output of the conical lens telescope. The output of the beam combiner it then imaged onto a two-dimensional photodetector array.

FIG. 5 depicts the third alternate embodiment of the present invention. This embodiment is a multiplicative time-integrating architecture where the other embodiments of the present invention are additive time-integrating architectures.

In FIG. 5, a laser light beam is expanded using a conventional beam expander. the expanded light beam is directed toward a Bragg cell. The input signal to the Bragg cell, which contains broadband Doppler shifts, is of the form $A_2(t) \cos wt$. The spatially modulated output of this Bragg cell is of the form $A_2(t-tau) \cos (w_0-w)t$ where $w_0$ is the frequency of the light beam. The output is then directed toward a conical lens telescope for compression and dilation of the Doppler-shifted light beam.

The output of the conical lens telescope is directed toward a point light modulator. A second signal of the form $A_1(t) \cos wt$ is provided to the point-light modulator. The output of the point-light modulator is then imaged onto a two-dimensional photodetector array.

DESCRIPTION OF THE PREFERRED EMBODIMENTS

1. The Best Mode of the Present Invention

Figure 1:
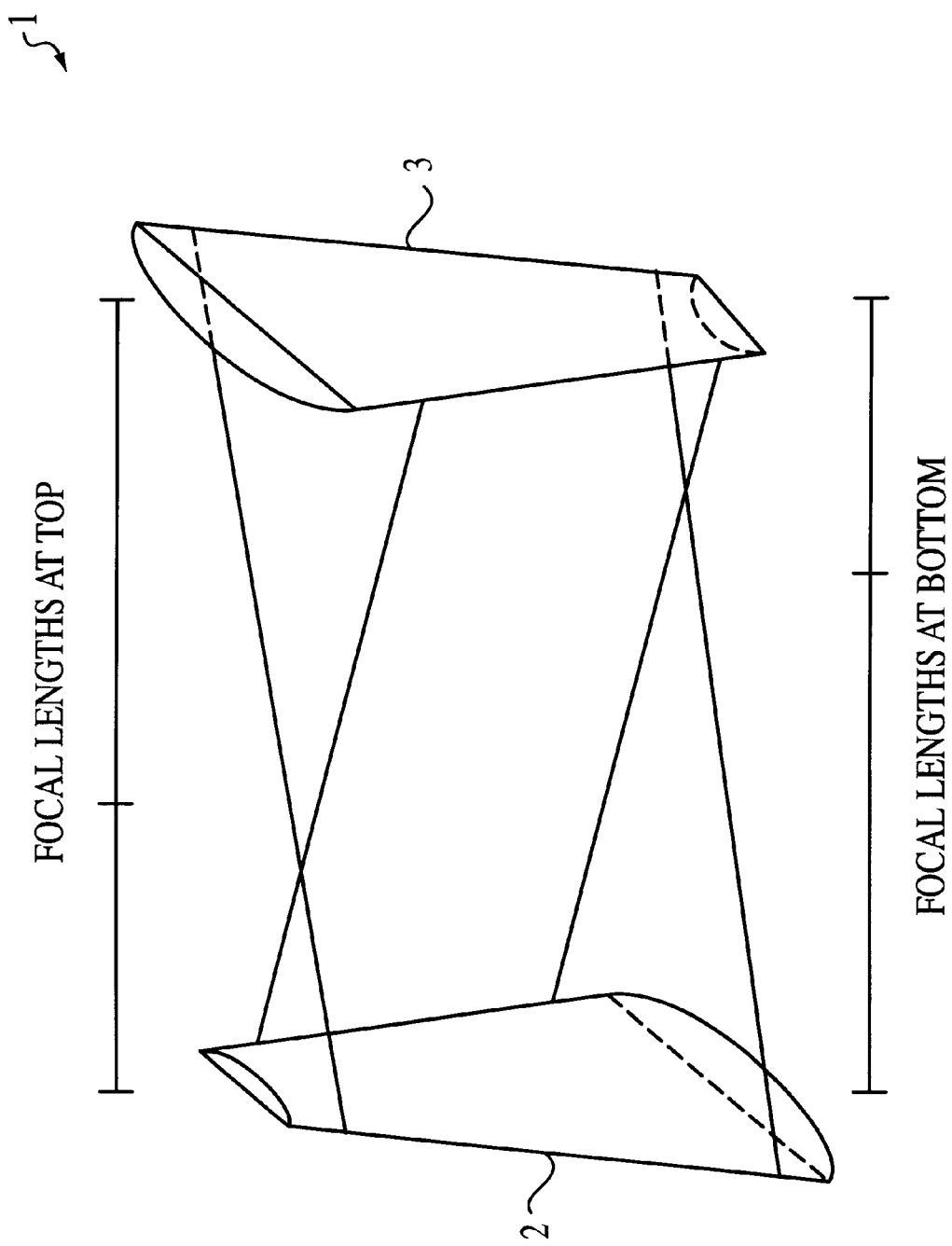
FIG. 1 illustrates a conical lens telescope.

FIG. 1 shows a conical lens telescope 1. The conical lens telescope 1 consists of a first conical lens 2 and a second conical lens 3. The second conical lens 3 is in line but inverted and rotated one-hundred and eighty degrees with respect to the first conical lens 1. The conical lens telescope gives the present invention the ability to variably-magnify, in one dimension, components of a broadband signal. of using a conical lens telescope is the ability to apply different magnification factors to different components of a signal. Variable-magnification is achieved due to the fact that the focal lengths of the two conical lenses 2,3 differ along the length of the conical lens telescope 1.

The magnification factor achieved by placing one lens after another is that the focal length of the second lens is divided by the focal length of the first lens. Therefore, at the top of a conical lens telescope 1, where the focal length of the second conical lens 3 is longer than the focal length of the first conical lens 2, the magnification factor is some number greater than one. Similarly, at the bottom of a conical lens telescope 1, where the focal length of the second conical lens 3 is shorter than the focal length of the first conical lens 2 the magnification factor is some number less than one. The result is that images at the top of a conical lens telescope will be expanded while images at the bottom will be compressed. The images in the middle of a conical lens telescope 1 will not change because in the middle of the conical lens telescope 1, the focal lengths of the two conical lenses 2,3 are the same.

The present invention uses the variable magnification feature of the conical lens telescope to compensate, in one dimension, for the differences in the absolute values of Doppler shift occurring in broadband signals. For example, different magnification factors can be applied to a 30 Hz frequency components of a signal (which is changed to a 33 Hz signal by a 10% Doppler shift) and a 300 Hz frequency component of the same signal (which is changed to a 330 Hz signal by the same 10% Doppler shift) in order to recover the original unaltered frequency components (i.e., 30 Hz and 300 Hz) of the signal.

Figure 2:
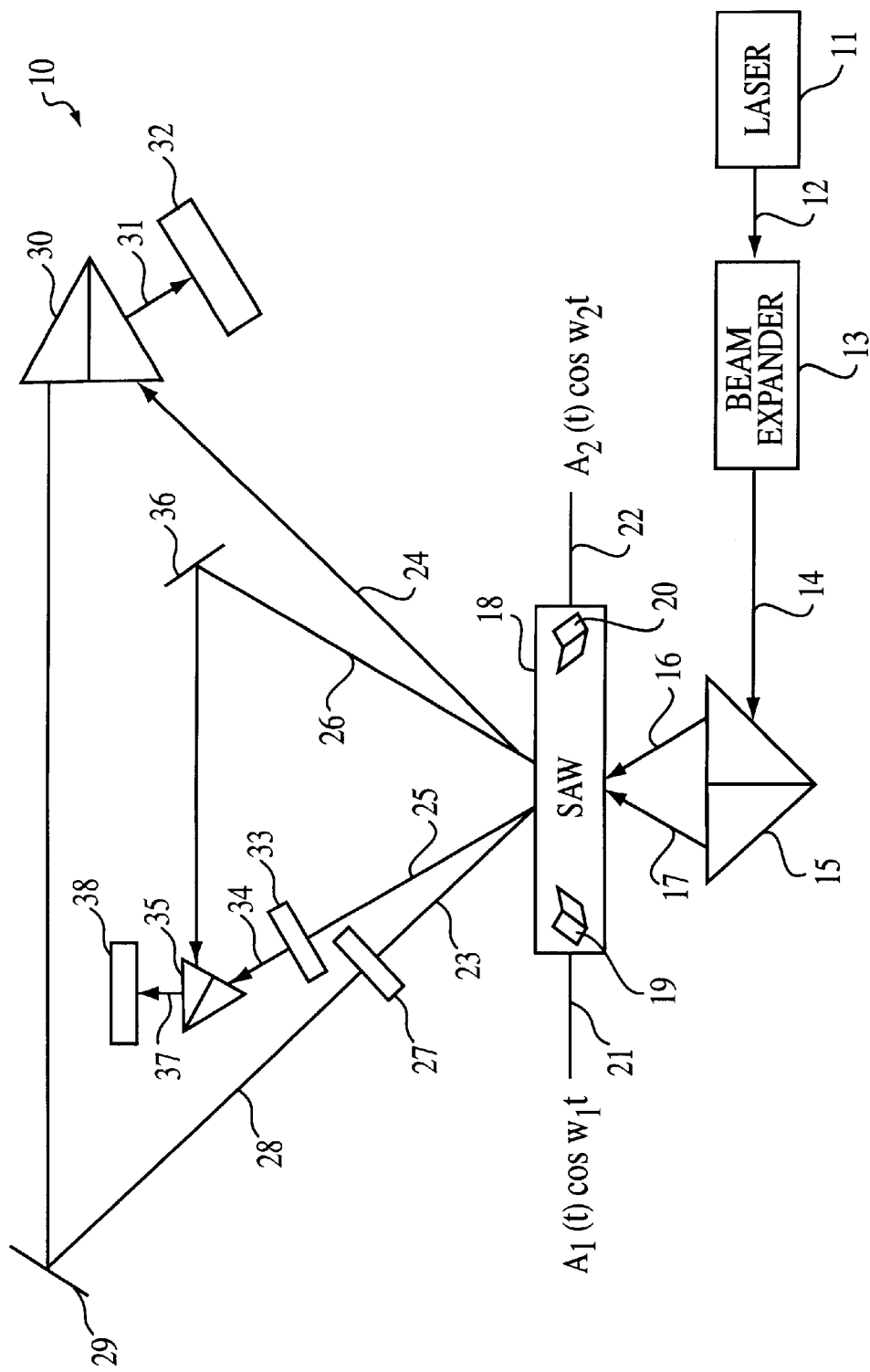
FIG. 2 is a schematic of an acousto-optic time integrating correlator that uses a SAW device to compensate for broadband Doppler effects on one signal.

The best mode 10 of the present invention is depicted in FIG. 2 which shows a time-integrating architecture which is useful for correcting for Doppler shift in broadband signals.

First, a laser 11 emits a laser light beam 12. The laser light beam 12 is expanded to a sheet beam using a conventional beam expander 13. The sheet beam 14 coming from the beam expander 13 is then split and angled using a conventional device known as a modified Koster's prism 15. Each sheet beam 16, 17 emanating from the modified Koster's prism 15 is tilted $\pm 2theta_B$ from the perpendicular. These two sheet beams 16, 17 are them directed toward a SAW device 18.

The SAW device 18 contains a first transducer 19 and a second transducer 20. The first transducer 19 is located at the left-end of the SAW device 18. The first transducer is tilted toward the center of the SAW device by an angle of $3theta_B$, where $theta_B$ is the Bragg angle of the SAW device 18. The second transducer 20 is located at the right end of the SAW device 18. The second transducer 20 is tilted toward the center of the SAW device 18 by $3theta_B$. The transducers 19, 20 are tilted in order to reduce interfering terms.

A first input 21 to the SAW device 18 is located at the left-end of the SAW device 18. has two inputs. The signal appearing at the first input 21 will propagate along the SAW device 18 toward the right-end of the SAW device 18.

A second input 22 to the SAW device is located at the right-end of the SAW device 18. Signals appearing at the second input 22 propagate along the SAW device 18 toward the left-end of the SAW device 18.

The acoustic input to second input 22 of the SAW device 18 is of the form $A_2(t) \cos w_2 t$, where $A_2(t)$ is the received signal which contains a Doppler-shifted broadband signal. $A_2(t)$ amplitude-modulates a carrier at frequency w, where w corresponds to the center frequency of the SAW device 18. A reference signal, which contains little or no Doppler shift, of the form $A_1(t) \cos w_1 t$ is applied to the first input 21 of the SAW device.

The right-hand sheet beam 16 emanating from the modified Koster's prism 15 will preferentially interact with $A_2(t) \cos w_2 t$ (i.e., the Doppler-shifted signal) as it propagates from the second input 22 to the left-end of the SAW device 18. The left-hand beam 17 of the modified Koster's prism 15 will preferentially interact with $A_1(t) \cos w_1 t$ (i.e., the reference signal) as it propagates from the first input 21 to the right-end of the SAW device 18. The SAW device 18 will diffract the two sheet beams 16, 17 and shift them up in frequency. The right-hand beam 16 will be shifted up in frequency by $w_2$ while the left-hand sheet beam 17 will be shifted up in frequency by $w_1$.

Two pairs of diffracted sheet beams 23,24 and 25,26 of interest will emanate from the SAW device 18. The first pair of diffracted sheet beams 23,24 are of form $A_1(t-tau) \cos (w_0+w_1)t$ and $A_2(t+tau) \cos (w_0+w_2)t$. These two diffracted sheet beams 23,24 are separated by $8theta_B$, where $theta_B$ is the Bragg angle for the SAW device 18. The other pair of sheet beams 25,26 of interest are the undiffracted sheet beams 16,17 (which came from the modified Koster's prism 15 and passed undiffracted through the SAW device 18). The undiffracted sheet beams 25,26 are separated by $4theta_B$.

The left sheet beam 23 of the first pair of sheet beams 23,24 (i.e., $A_2(t+tau) \cos (w_0+w_2)t$) is imaged onto a first conical lens telescope 27 in order to variably-magnify each frequency component of the Doppler-shifted signal. The output 28 of the first conical lens telescope 27 is redirected by a first mirror 29 and then combined with the right sheet beam 24 of the first pair of sheet beams 23,24 (i.e., $A_1(t-tau) \cos (w_0+w_1)t$). A second modified Koster's prism 30 is used to combine the sheet beam 28 coming from the first conical lens telescope 27 and the right sheet beam 24 of the first pair of sheet beams 23,24. The output 31 of the second modified Koster's prism 30 is then imaged onto a first two-dimensional photodetector array 32.

The undiffracted left-half sheet beam 25 of the second pair of sheet beams 25,26 is imaged onto a second conical lens telescope 33. The output 34 of the second conical lens telescope 33 is combined with the undiffracted right-half sheet beam 26 using a third modified Koster's prism 35 after the right-half sheet beam 26 is redirected by a second mirror 36. The output 37 of the third modified Koster's prism 35 is then imaged onto a second two-dimensional photodetector 38. The output of the second two-dimensional photodetector 38 represents the unmodulated light profile. Offsets occurring in the output of the first photodetector 32 are significantly reduced by subtracting the unmodulated light profile of the second photodetector 38 from the output of the first photodetector 32. This subtraction can be accomplished using conventional digital signal processing components which are not shown.

2. An Alternate Embodiment of the Present Invention

Figure 3:
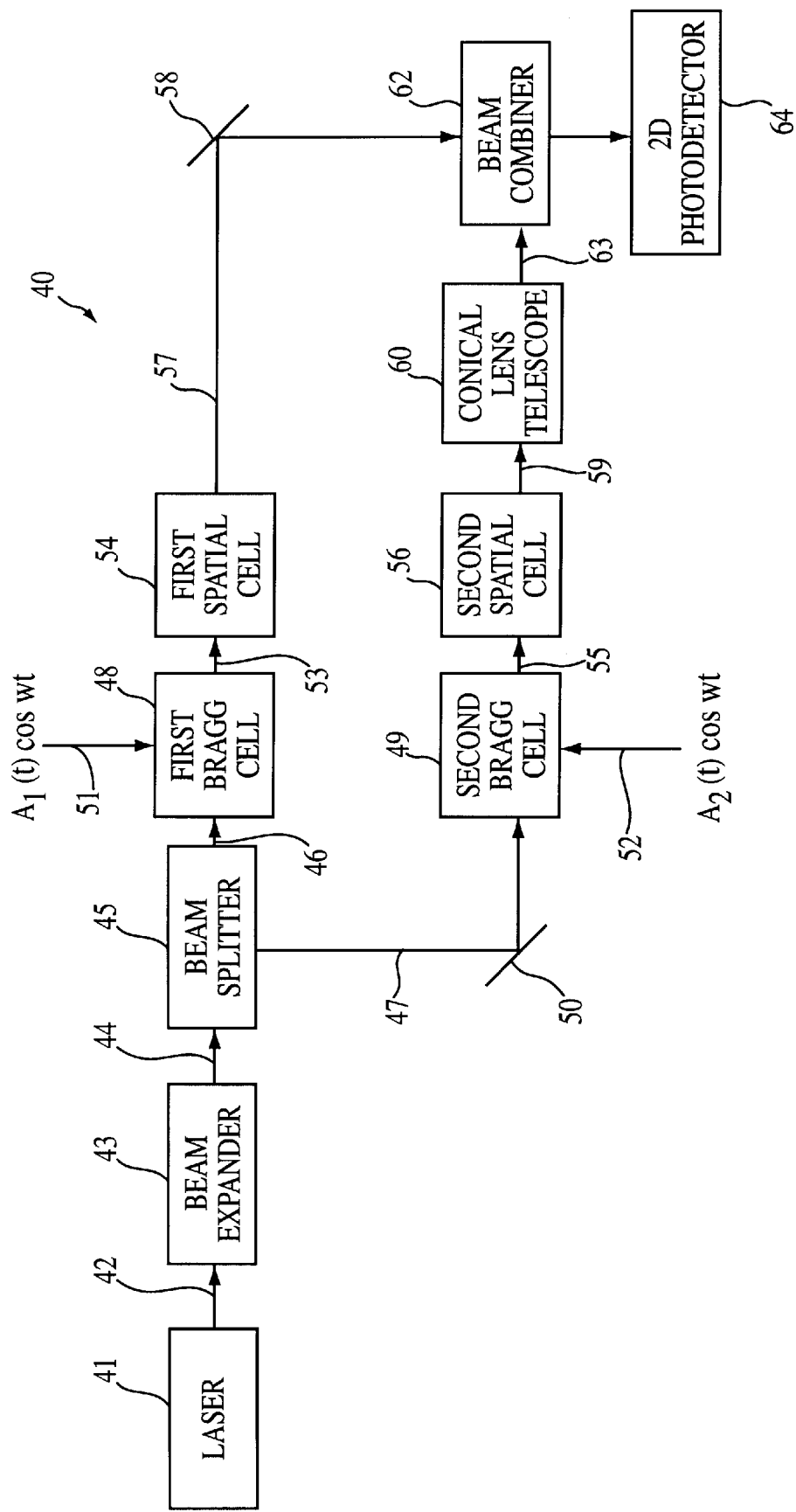
FIG. 3 is a schematic of an additive-architecture acousto-optic time integrating correlator that uses two conterpropagating waves.

The conical lens telescope 1 of FIG. 1 can be used to improve the broadband processing prior art architectures that presently use cylindrical lenses. FIG. 3 depicts the first alternate embodiment 40 of the present invention.

In FIG. 3, a laser 41 generates a laser light beam 42. The laser light beam 42 is expanded using a conventional beam expander 43 to a sheet beam 44. The sheet beam 44 is then divided using a conventional beam splitter 45 into two sheet beams 46,47. These two sheet beam 46,47 are then respectively imaged onto a first Bragg cell 48 and a second Bragg cell 49. One of the sheet beams 47 must be redirected using a mirror 50 before being imaged onto the second Bragg cell 49. A Bragg cell is essential one that allows an acoustic input to diffract a light beam. The light beam output of the Bragg cell is now mathematically related to the acoustic input signal.

An acoustic signal of the form $A_1(t) \cos wt$ is presented to an input 51 to the first Bragg cell 48. The signal appearing at the input 51 of the first Bragg cell 48 is the received signal which contains Doppler-shifted broadband signals. $A_1(t)$ amplitude-modulates a carrier at frequency w, where w corresponds to the center frequency of the Bragg cell. A reference signal, which contains little or no Doppler shift, of the form $A_2(t) \cos wt$ is presented to an input 52 to the second Bragg cell 49. The output 53 of the first Bragg cell 48 goes through a first spatial filter 54 in order to remove undiffracted light beams. The output 56 of the second Bragg cell 49 goes through a second spatial filter 56 for the same reason given above. The two input signals to the two Bragg cells 48,49 are counterpropagating.

The light beam 57 emanating from the first spatial filter 54 is redirected using a second mirror 58. The light beam 59 emanating from the second spatial filter 56 is directed toward a conical lens telescope 60. The variable magnification factors of this telescope 60 contracts and dilates $A_2(t-tau) \cos (w_0-w)t$ over the range that corresponds to the possible Doppler shift of signal $A_1(t)$. Therefore, a range of Doppler-shift-corrected $A_2(t)$'s are generated. One of these generated signals will correlate with $A_1(t)$.

The redirected light beam 57 is combined with the output 61 of the conical lens telescope 60 using a conventional beam combiner 62. The output 63 of the beam combiner 62 is then imaged onto a two-dimensional photodetector 64. The photodetector 64 performs integration for the duration of the signals. The x-axis of the photodetector 64 corresponds to time delay between the two signals, from which range information can be obtained. The y-axis of the photodetector 64 corresponds to the Doppler shifts, where the negative shifts on the top and the positive shifts on the bottom.

3. A Second Alternate Embodiment of the Present Invention

Figure 4:
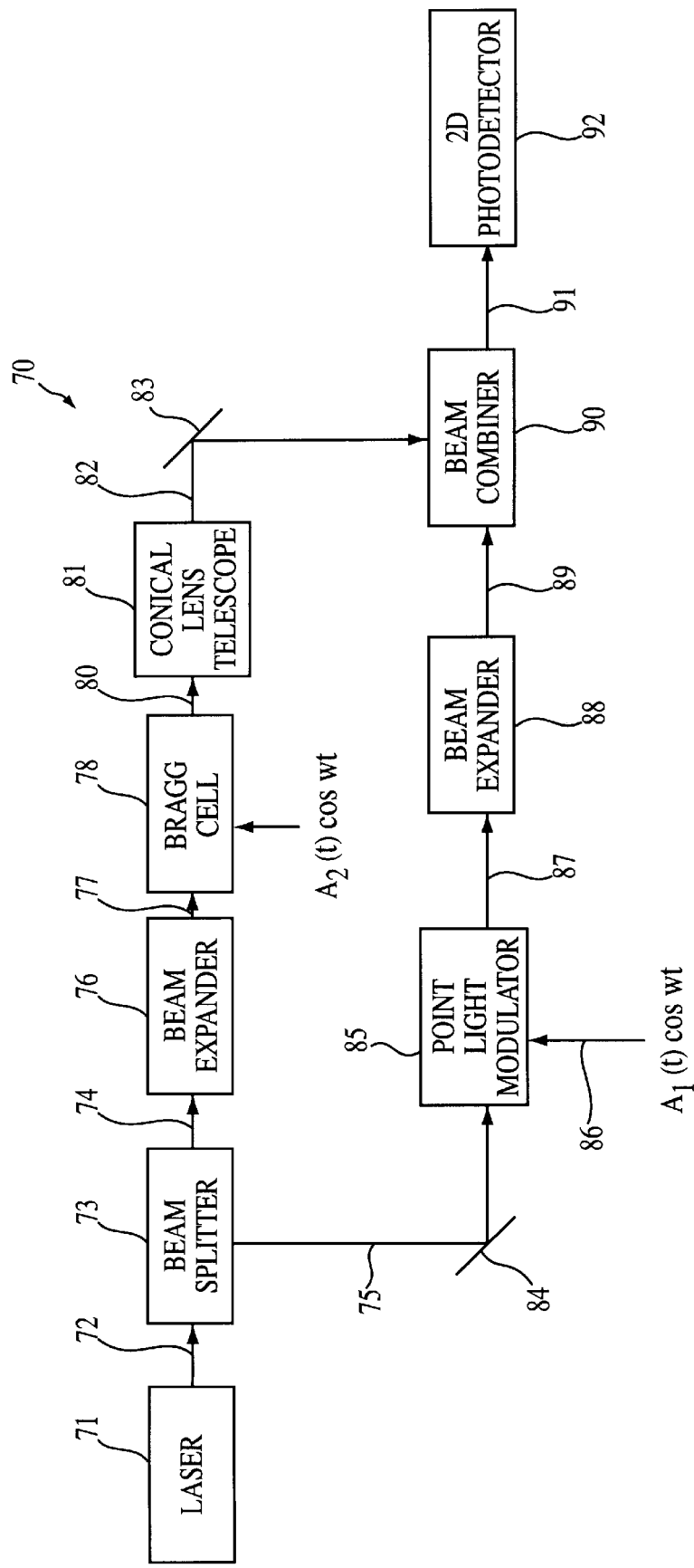
FIG. 4 is a schematic of an additive-architecture acousto-optic time integrating correlator that uses one propagating wave.

A second alternate embodiment 70 of the present invention is depicted in FIG. 4. In this embodiment 40, a laser 71 generates a laser light beam 72. The laser light beam 72 is split, using a conventional beam splitter 73, into a first split beam 74 and a second split beam 75. The first split beam 74 is expanded to a sheet beam using a conventional beam expander 75. The expanded beam 77 is directed toward a Bragg cell 78. An input signal 79 to the Bragg cell 78, which contains broadband Doppler shifts, is of the form $A_2(t) \cos wt$. The spatially modulated output 80 of the Bragg cell 78 is of the form $A_2(t-tau) \cos (w_0-w)t$, where $w_0$ is the frequency of the Doppler-shifted light beam. The output 80 of the Bragg cell 78 is directed toward a conical lens telescope 81 for compression and dilation of the Doppler-shifted light beam. The output of the conical lens telescope 82 is redirected by a mirror 83.

The second split beam 75 is redirected, by a second mirror 84, toward a point light modulator 85. A second signal of the form $A_1(t) \cos wt$ is provided to an input 86 to the point-light modulator 85. The point-light modulator 85 can realized with a Bragg cell or an electro-optic modulator. The output 87 of the point-light modulator 85 is then expanded using a conventional beam expander 88. The output 89 of the beam expander 88 is then combined with the redirected output 82 of the conical lens telescope 81 using a conventional beam combiner 90. The output 91 of the beam combiner 90 is then imaged onto a two-dimensional photodetector 92.

4. A Third Alternate Embodiment of the Present Invention

Figure 5:
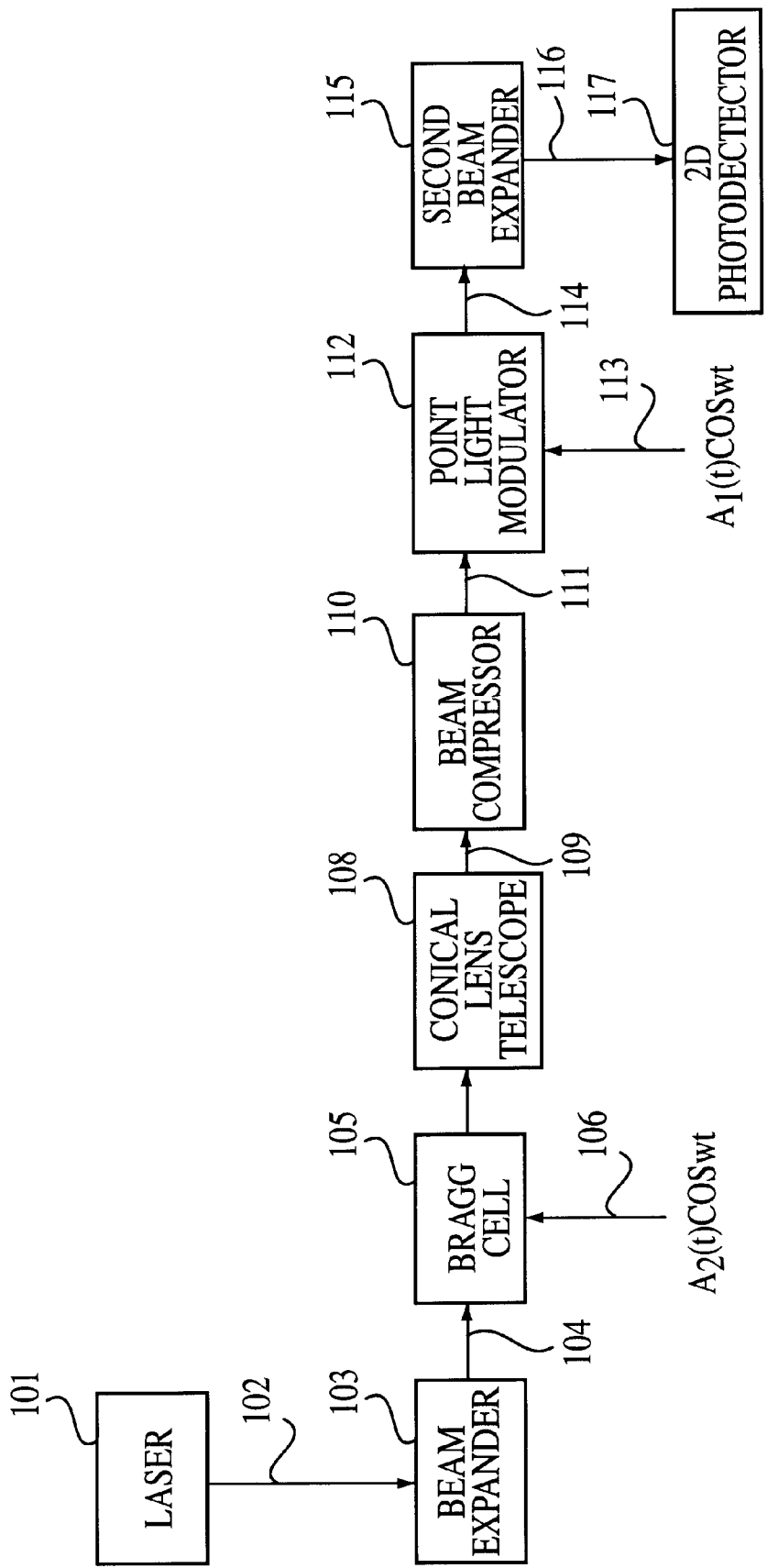
FIG. 5 is a schematic of a multiplicative architecture acousto-optic time integrating correlator.

FIG. 5 depicts the third alternate embodiment 100 of the present invention. This embodiment 100 is a multiplicative time-integrating architecture where the other embodiments of the present invention are additive time-integrating architectures.

In FIG. 5, a laser 101 generates a laser light beam 102. The laser light beam 102 is expanded using a conventional beam expander 103. The output 104 of the beam expander 103 is directed toward a Bragg cell 105. The input signal to the Bragg cell 106, which contains broadband Doppler shifts, is of the form $A_2(t) \cos wt$. The spatially modulated output 107 of the Bragg cell 105 is of the form $A_2(t-tau) \cos (w_0-w)t$, where $w_0$ is the frequency of the Doppler-shifted light beam. The output 107 of the Bragg cell 105 is directed toward a conical lens telescope 108 for compression and dilation.

The output 109 of the conical lens telescope 108 is directed toward a beam contractor 110 which converts the sheet beam output 109 of the conical lens telescope 108 to a point beam 111. The point-light beam 111 is modulated by a point light modulator 112. A second signal of the form $A_1(t) \cos wt$ is provided to the input 113 of the point-light modulator 112. The output 114 of the point-light modulator 112 is expanded by a second beam expander 115. The output 116 of the second beam expander 115 is then imaged onto a two-dimensional photodetector 117.

What is claimed is:

1. An acousto-optic time integrating correlator for processing broadband Doppler-shifted signals, comprising:
    a) a means for producing a laser light beam;
    b) a means for expanding the laser light beam into a first sheet beam;
    c) a first modified Koster's prism for splitting the first sheet beam into a second sheet beam and a third sheet beam and redirecting the second sheet beam and the third sheet beam;
    d) a SAW device having an axis and a planar surface extending along the axis between opposite first and second ends, where said SAW device is disposed in the path of the second sheet beam and the third sheet beam;
    e) a first acoustic-transducer, disposed at the first end of said SAW device at an angle relative to the axis of said SAW device which is equal to +3theta$_B$, where theta$_B$ is the Bragg angle of said SAW device;
    f) a first signal, supplied to said first acoustic transducer, for propagating said first signal on the surface of said SAW device in the direction of the second end of said SAW device;
    g) a second acoustic-transducer, disposed at the second end of said SAW device at an angle relative to the axis of said SAW device which is equal to −3theta$_B$;
    h) a second signal, supplied to said second acoustic transducer, for propagating said second signal on the surface of said SAW device in the direction of the first end of said SAW device;
    i) a first conical lens telescope disposed in the path of the diffracted third sheet beam, where the third sheet beam has been diffracted by said SAW device;
    j) a second conical lens telescope disposed in the path of the third sheet beam;
    k) a first mirror for redirecting the output of said first conical lens telescope;
    l) a second modified Koster's prism for combining the redirected output of said first conical lens telescope and the diffracted second sheet beam, where the second sheet beam has been diffracted by said SAW device;
    m) a first two-dimensional photodetector for time-integrating the output of said second modified Koster's prism;
    n) a second mirror for redirecting the second sheet beam;
    o) a third modified Koster's prism for combining the redirected second sheet beam and the output of said second conical lens telescope;
    p) a second two-dimensional photodetector for time-integrating the output of said third modified Koster's prism; and
    q) a means for subtracting the output of said second photodetector from the output of said first photodetector.

2. A method of processing broadband Doppler-shifted signals, comprising the steps of:
    a) expanding a laser light beam into a first sheet beam;
    b) splitting the first sheet beam into a second sheet beam and a third sheet beam using a first modified Koster's prism;
    c) redirecting the second sheet beam and the third sheet beam toward a SAW device, wherein the SAW device has a first acoustic transducer, disposed at a first end of said SAW device at an angle of +3theta$_B$, and having a second acoustic transducer disposed at a second end of said SAW device at an angle of −3theta$_B$, where theta$_B$ is the Bragg angle for said SAW device;
    d) propagating a first signal on the planar surface of said SAW device toward the second end of said SAW device;
    e) propagating a second signal on the planar surface of said SAW device toward the first end of said SAW device;
    f) diffracting said second sheet beam using said SAW device such that a diffracted second sheet beam and an undiffracted second sheet beam will emanate from said SAW device;
    g) diffracting said third sheet beam using said SAW device such that a diffracted third sheet beam and an undiffracted third sheet beam will emanate from said SAW device;
    h) processing the diffracted third sheet beam using a first conical lens telescope;
    i) processing the undiffracted third sheet beam using a second conical lens telescope:
    j) redirecting the output of said first conical lens telescope using a first mirror;
    k) Combining the result of step (j) with said diffracted second sheet beam using a second modified Koster's prism;
    l) redirecting the undiffracted second sheet beam using a second mirror;
    n) combining the result of step (l) with the result of step (i) using a third modified Koster's prism;
    o) time-integrating the result of step (k) using a first two-dimensional photodetector;
    p) time-integrating the result of step (n) using a second two-dimensional photodetector; and
    q) subtracting the result of step (p) from the result of step (o).

3. An acousto-optic time integrating correlator for processing broadband Doppler-shifted signals, comprising:
    a) a means for producing a laser light beam;
    b) a first means for expanding the laser light beam into a sheet beam;
    c) a Bragg cell disposed in the path of the sheet beam;
    d) a first signal, supplied to said Bragg cell, for diffracting said sheet beam;
    e) a conical lens telescope disposed in the path of the diffracted sheet beam;
    f) a means for converting the output of said conical lens telescope to a point beam;
    g) a point light modulator disposed in the path of the point beam;
    h) a second signal, supplied to said point light modulator for modulating the point beam;
    i) a second means for expanding the modulated point beam to a second sheet beam, where said second expanding means is disposed in the path of the modulated point beam; and
    j) a two-dimensional photodetector disposed in the path of the expanded point beam.

4. A method of processing broadband Doppler-shifted signals, comprising the steps of:
 a) expanding a laser light beam into a first sheet beam;
 b) diffracting the first sheet beam;
 c) processing the diffracted first sheet beam using a conical lens telescope;
 d) converting the output of said conical lens telescope to a point beam;
 e) modulating the point beam;
 f) expanding the modulated point beam to a second sheet beam; and
 g) time-integrating the second sheet beam using a two-dimensional photodetector.

* * * * *